(12) United States Patent
Morello

(10) Patent No.: US 8,746,609 B2
(45) Date of Patent: Jun. 10, 2014

(54) PAPER ROLL CORE INCLUDING SIGNALING DEVICE METHODS OF USING AND MAKING THE SAME AND PRODUCTS PRODUCED THEREBY

(76) Inventor: Peter Morello, Stuart, FL (US)

( * ) Notice: Subject to any disclaimer, the term of this patent is extended or adjusted under 35 U.S.C. 154(b) by 211 days.

(21) Appl. No.: 13/324,247

(22) Filed: Dec. 13, 2011

(65) Prior Publication Data

US 2013/0146702 A1   Jun. 13, 2013

(51) Int. Cl.
*B65H 26/00* (2006.01)
(52) U.S. Cl.
USPC .......................................... 242/534; 242/912
(58) Field of Classification Search
USPC .......................................... 242/534, 563, 912
See application file for complete search history.

(56) References Cited

U.S. PATENT DOCUMENTS

| | | | | |
|---|---|---|---|---|
| 6,099,178 A * | 8/2000 | Spurr et al. | | 400/207 |
| 6,334,587 B1 * | 1/2002 | Roder | | 242/563 |
| 6,653,940 B2 * | 11/2003 | Collura | | 340/572.8 |
| 6,802,659 B2 * | 10/2004 | Cremon et al. | | 400/76 |
| 6,824,320 B1 * | 11/2004 | Kerr et al. | | 396/512 |
| 6,958,697 B2 * | 10/2005 | Morello et al. | | 340/572.1 |
| 7,287,721 B2 * | 10/2007 | Quick et al. | | 242/563 |

* cited by examiner

*Primary Examiner* — Sang Kim
(74) *Attorney, Agent, or Firm* — Peter K. Trzyna, Esq.

(57) ABSTRACT

An article and processes and products are related to a paper roll and core including signaling device. The process may, but need not, include positioning a paper roll core comprising a body which is generally cylindrical in shape and having an outer wall spaced from an inner wall with a signaling device between the outer wall and the inner wall, within a circumferentially located paper roll having a width of paper corresponding to the length of the core.

10 Claims, 3 Drawing Sheets

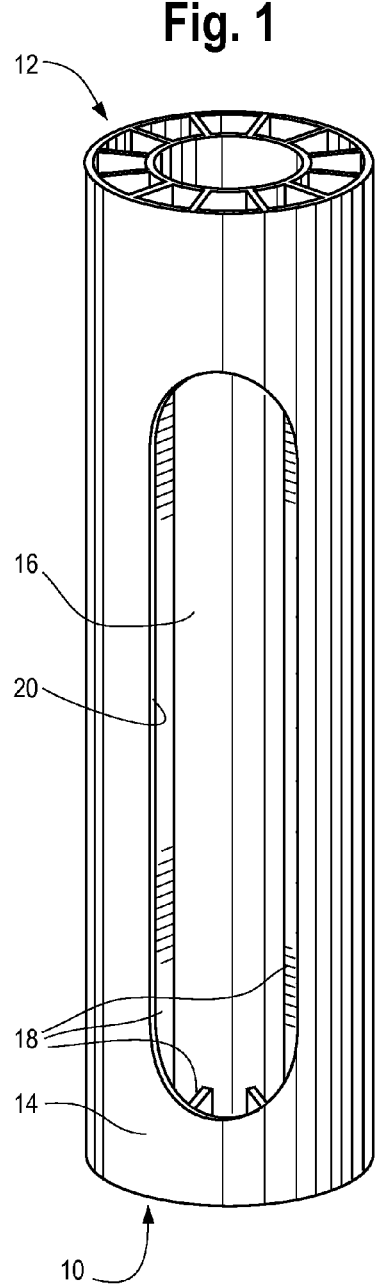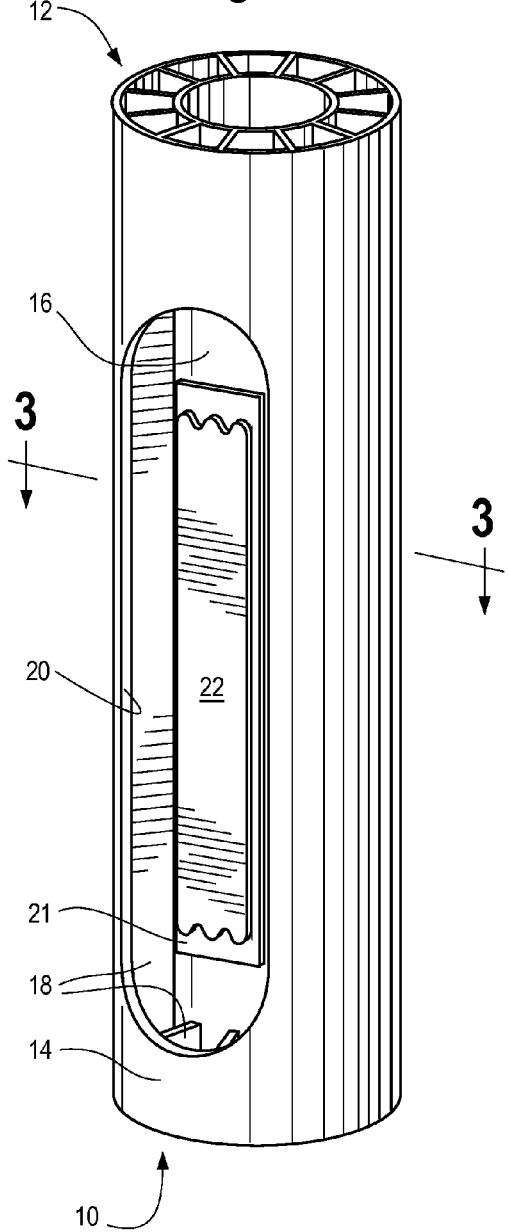

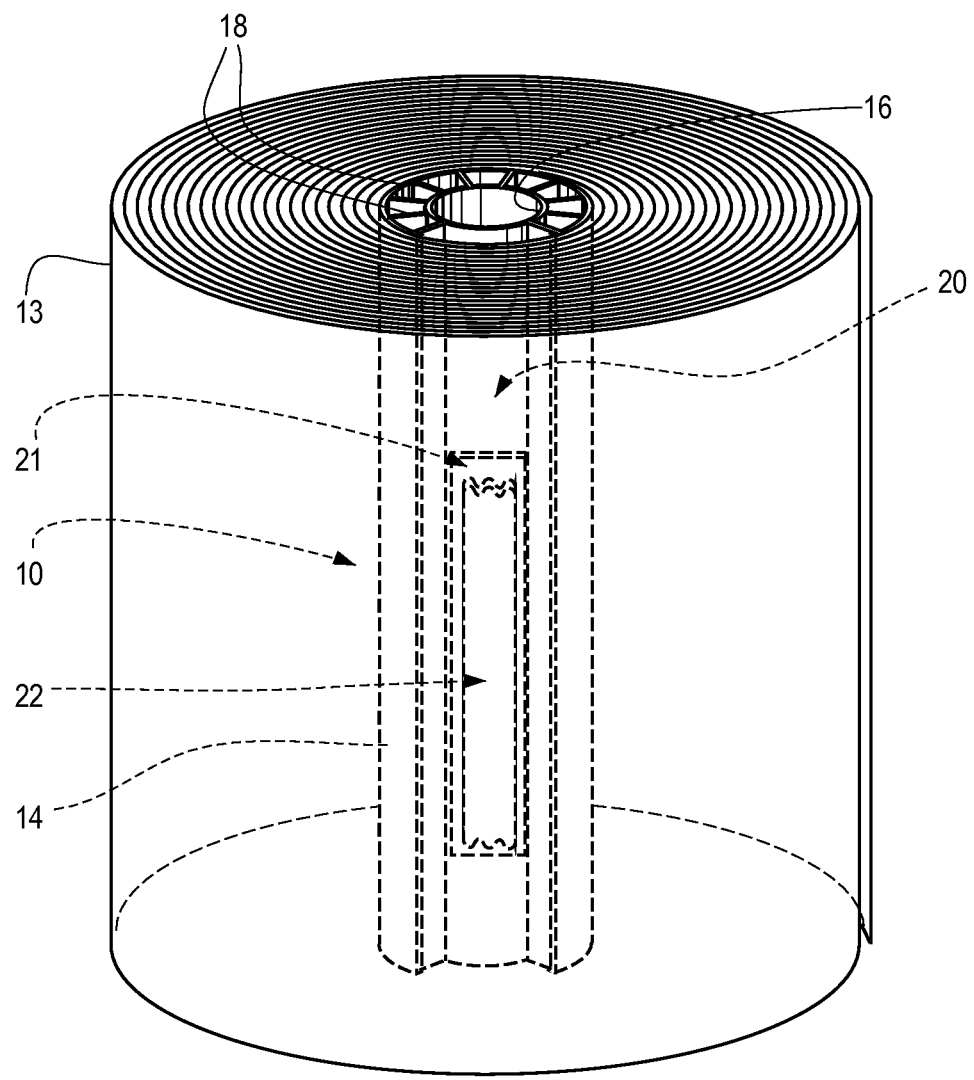

PAPER ROLL CORE INCLUDING SIGNALING DEVICE METHODS OF USING AND MAKING THE SAME AND PRODUCTS PRODUCED THEREBY

I. TECHNICAL FIELD

The technical field pertains to paper roll core having a signaling capacity.

II. SUMMARY

Depending on the implementation, there is an apparatus, article, a method for use, and a method for making, and corresponding products produced thereby, relating to paper roll core signaling device technology.

III. BRIEF DESCRIPTION OF THE DRAWINGS

FIG. 1 is a perspective view of the paper roll core with signaling device of an embodiment.

FIG. 2 is a perspective view of the core body of FIG. 1 of an embodiment.

FIG. 6 is a perspective view of the other embodiment.

IV. MODES

Depending on the embodiment of interest for one preferred application or another, there can be a paper roll core, such as that about which cash register tape is wound, the core including a signaling device fixedly received within a body of the core to signal if the paper roll is being moved with respect to a detector, e.g., improperly from the premises. In some embodiments, the core can be a corrugated core having an opening created therein through an outer peripheral surface thereof, along a length thereof, sized, and configured to fixedly receive therein the signaling device.

As may be preferred in some embodiments, the core can comprise a body which is generally cylindrical in shape and having an outer wall spaced from an inner wall with the signaling device positioned between the outer wall and the inner wall. In some embodiments, the paper roll core is created from extruded material.

In some embodiments, the paper roll—including an antitheft signaling device—is not affixed to a flattened portion of an outer periphery of the roll core, where by the positioning of the signaling device avoids compression to the extent of destruction of the signaling device by the paper being rolled around the core and device. So some embodiments provide a paper roll core including signaling device wherein the signaling device can not be compromised during winding of paper thereabout.

Figure 3:
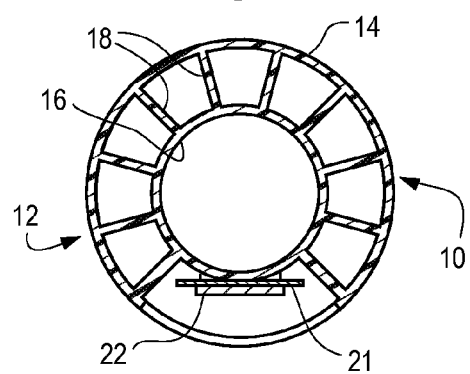
FIG. 3 is a cross sectional view through the core of FIG. 2 along line 3-3 of an embodiment.

Referring now FIGS. 1-3 in greater detail there is illustrated therein a first embodiment of the paper roll core including signaling device, illustrative of the broader teachings herein and generally identified by the reference numeral 10.

FIG. 1 is a perspective view of the paper roll core with signaling device generally showing an opening created in at least a portion of a core body of the core roll, the opening extending into the body and toward an inner surface of the roll core, sized and configured for fixedly receiving an electronic signaling device therein. The paper roll core 10 includes a body 12 comprised of any suitable material, such as cardboard or plastic, and is illustrated in FIG. 1 to be substantially in the form of a corrugated cylinder 12, which is sized and configured as required for use in its particular environment. In one environment, the paper roll core 10 includes a roll of cash register tape 13 of corresponding width, as relates to the length of the body 12, circumferentially rolled or wrapped around the core body 12. For use in this environment, the body 12 of the paper roll core 10 has a thickness of approximately 0.4 inches, an outer diameter of approximately 0.9 inches, and an inner diameter of diameter of approximately 0.4 inches.

The body 12 comprises an outer peripheral wall 14, spaced from an inner peripheral wall 16 thereof by an area of corrugation 18. Along at least a portion of the length of the core body 12, there is provided an opening 20 extending through the outer peripheral wall 14, interrupting the corrugation, and extending substantially to the inner peripheral wall 16. The opening 20 is sized and configured to receive therein a signaling device 22 which can be of any suitable form. The signaling device can be fixed within the opening 20 through engagement thereof via any suitable adhesive 21 to the inner peripheral wall 16. The signaling device could be electronic in nature or could be magnetic in nature, in the form of a smart tag 22, or the like. It will be understood, though, that the examples of various characteristics of the paper roll core 20 presented herein should not be construed as limiting, but only exemplary.

FIG. 2 is a perspective view of the core body of FIG. 1 and now shows an electronic signaling device fixedly positioned within the opening in the core body. FIG. 3 is a cross sectional view through the core of FIG. 2 along line 3-3 showing the signaling device fixedly engaged within the opening in the body of the core.

Figure 4:
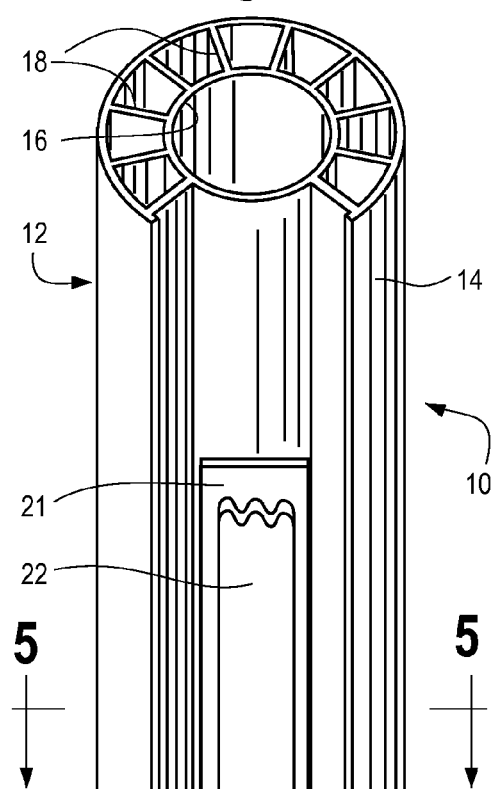
FIG. 4 is a perspective view of another embodiment of the paper roll core with signaling device.
Figure 5:
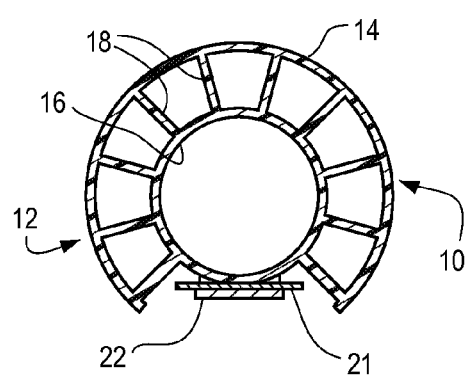
FIG. 5 is a cross sectional view through the roll core of FIG. 4.

Turning now to FIGS. 4-6, like items to those of FIGS. 1-3 will be identically numbered, to maintain simplicity in understanding. Here it will be seen that body 12 of the paper roll core 10 is, again substantially in the form of a corrugated cylinder 12 and again sized and configured for use in any suitable environment. In this embodiment 10, however, it will be seen that the opening 20 extends along the entire length of the core body 12, into the body 12, toward the inner peripheral wall 16, the opening 20 having a width dimension again suitable for receiving a signaling device 22 therein, with the device 22 again being engaged to the inner peripheral wall 16 by any suitable adhesive 21. This embodiment can be created from an extruded material, such as plastic through an extrusion process. Such embodiments can be effective without compromising integrity of the paper roll core 10. It will further be understood that the material of the core body 12 may, depending on the particular application desired, may be of a recyclable or a nonrecyclable material.

More particularly, FIG. 4 is a perspective view of the second embodiment of the paper roll core with signaling device, showing the opening extending along the entire length of the body of the core roll, the opening extending into the body and toward an inner surface of the roll core and showing a signaling device fixedly received in the opening in a somewhat centered position along the length of the roll core, the full length opening allowing for the roll core to be inexpensively made through extrusion.

FIG. 5 is a cross sectional view through the roll core of FIG. 4, showing the signaling device fixedly attached to same within the opening created in the core body.

FIG. 6 is a perspective view of the second embodiment of the paper roll core of FIG. 5, showing the core in its working environment within a roll of paper wrapped therearound.

In some embodiments, there can be an article of manufacture which includes a paper roll core, comprising a core body having a signaling device within an opening extending into the body from an outer wall toward an inner wall, spaced from the outer wall, and a paper roll circumferentially located around the paper roll core, the paper having a width corresponding to the length of the core.

Analogously, there can be a process for making an embodiment, such as an article, as discussed herein. So for example, there can be a process of making paper roll and core including signaling device, the process including: positioning a paper roll core comprising a body which is generally cylindrical in shape and having an outer wall spaced from an inner wall with a signaling device between the outer wall and the inner wall, within a circumferentially located paper roll having a width of paper corresponding to the length of the core.

Make the core can be carried out by extruding the core through a die configured to the size of an opening along a length of the body, e.g., the opening extending into the body toward the inner wall, the opening is sized and configured to receive the signaling device, etc. The extruding can include receiving a slug of material to be extruded, e.g., of plastic, so that when the extruded material is extruded, there is an opening, slit, cut, or the like to accommodate the signaling device. Subsequent to the extruding, there can be a cutting of the core to the desired length for the core.

In another embodiment, the core can be molded, e.g., including closing faces of a mold together around the material for the core so as to mold the core, followed by opening the faces and removing the core.

Note that whether the core is formed by extruding or molding, the opening can be formed by machining the core to form the opening.

In some embodiments, there can be an extending of corrugation, e.g., ribs, from the inner wall to the outer wall of the core. And in some embodiments, the ribs are not of equal thickness, e.g., the rib(s) closer or closest to the core can be thicker than the other ribs so as to prevent compression of the outer wall to the extent that the paper contacts the signaling device when paper is added around the roll.

In embodiments herein, the signaling device is located so that the signaling device is not in contact with the paper after the paper is located around the core. The signaling device, can be adhesively, mechanically, or otherwise mounted to the core within the opening.

Thereafter, there can be a adhering (e.g., gluing) the paper to the core and wrapping the paper around the core, e.g., by locating the core on a spindle configured to accept the inside diameter void corresponding to the inner wall of the core and wrapping of the paper around the core to the desired length of the paper (e.g., in the range of 3-3¼), and using a slitter to cut the paper to the desired length. Of course, this process can be carried out with many cores and blades to simultaneously produce more than one roll with a signaling device therein. The roll(s) can be ejected off the spindle(s) for use as may be desired.

Note that a core having a signaling device can also be a recycled core, which is retrieved from its use (as discussed below), tested to ensure that the signaling device is functioning, and re-wrapped with paper.

A paper rolls with cores including respective signaling devices can be located, for example, at a point of sale device such as a cash register. A detector, e.g., such as that available from Sensomatic, Inc., can be located adjacent an exit to detect the frequency or other signal from the signaling device. If there is a detection of an unauthorized removal of the core past the detector, an alarm can be triggered, thereby providing security for the paper roll. In such embodiments, the cores with signaling devices can be used in methods of deterring or preventing counterfeiter retail receipts, fraudulent returns, shoplifting, tax evasion, etc.

So depending on the embodiment, the core can be configured to house a (EAS) Electronic Article Surveillance device. Once the core is made one by (1) extruded plastic through a tube than cut to size based on size needed or (2) by injection molding equipment using a tooled mold. Then the core is ready for application of the EAS tag which is put into the core, e.g., by using an adhesive. Then the core can be shipped to a paper converter who then puts the core into an automated coring system which will load the appropriate amount of core on to a spindle. Once the spindle is loaded with cores, the slitter winds paper on to the core, and the amount paper can varies depending on the desired application. Configured so that the EAS tag will not be harmed by this process or from pressure from the paper, the EAS tags can continue to operate properly even after the roll is used, thereby permitting the cores and EAS tags to be recycled and reused. The cores can be sent back to the converter of the rolls, to be reused since the EAS tag as not be deactivated, or a non-deactivate-able EAS tag can be used.

As described above, the paper roll core 10 is subject to modifications to the paper roll core 10, and can involve other signaling devices, the combination thereof providing alternatives without departing from the teachings herein. In any case, there are many of variations that may utilize the teachings herein, depending on the particular implementation preferred in one situation or another. Thus, the terms and expressions which have been employed herein are used as terms of teaching and not of limitation, and there is absolutely no intention, in the use of such terms and expressions, of excluding equivalents of the features shown and described, or portions thereof, it being recognized that various modifications are possible within the scope of the embodiments contemplated and suggested herein. Similarly, the disclosure herein has been described with reference to embodiments, and the disclosures are intended to be illustrative and are not intended to be limiting. Various modifications and applications may occur to those skilled in the art without departing from the true spirit and scope of what is communicated hereby, as defined in the appended claims.

Therefore, although only a few exemplary embodiments have been described in detail above, those skilled in the art can readily appreciate that many modifications are possible in the exemplary embodiments without materially departing from the novel teachings and advantages herein. Accordingly, all such modifications are intended to be included within the scope defined by claims. In the claims, means-plus-function claims are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment fastening wooden parts, a nail and a screw may be equivalent structures.

I claim:

1. An apparatus comprising: a paper roll core, a magnetic signaling device, and paper wrapped around the core, the core comprising a body which is generally cylindrical in shape and having an outer wall spaced from an inner wall by corrugations comprising ribs, the outer wall of the body having an opening along a length of the body, the opening extending into the body toward the inner wall, the signaling device positioned within the opening, between the outer wall and the inner wall, between two of the ribs but not within any of the ribs, adhesively fixed to the inner wall of the body, and not in contact with the paper.

2. The apparatus of claim 1, wherein at least one of the ribs thicker than an other of the ribs.

3. The apparatus of claim 1, wherein the body is made of an extruded material.

4. The apparatus of claim 3, wherein the extruded material is plastic.

5. The apparatus of claim 1, wherein the body has a thickness of approximately 0.4 inches.

6. The apparatus of claim 1, wherein the outer wall has a diameter of approximately 0.9 inches.

7. The apparatus of claim 1, wherein the inner wall has a diameter of approximately 0.4 inches.

8. A process including: locating a paper roll circumferentially around a paper roll core and a magnetic signaling device, the core comprising a body which is generally cylindrical in shape and having an outer wall spaced from an inner wall by corrugations comprising ribs, the outer wall of the body having an opening along a length of the body, the opening extending into the body toward the inner wall, the signaling device being located within the opening, between the outer wall and the inner wall, between two of the ribs but not within any of the ribs, adhesively fixed to the inner wall of the body, such that the paper is not fixed in contact with the magnetic signaling device.

9. The process of claim 8, further comprising extruding the core from plastic so that at least one of the ribs is thicker than another of the ribs.

10. A product produced by the process of claim 8.

\* \* \* \* \*